United States Patent [19]

Leon

[11] Patent Number: 4,911,004

[45] Date of Patent: Mar. 27, 1990

[54] DEVICES AND METHODS FOR DETERMINING AXIAL LOADS

[75] Inventor: Robert L. Leon, Roslyn, Pa.

[73] Assignee: Liberty Technology Center, Inc., Conshohocken, Pa.

[21] Appl. No.: 232,392

[22] Filed: Aug. 15, 1988

[51] Int. Cl.$^4$ .......................................... G01M 19/00
[52] U.S. Cl. .................................. 73/168; 73/862.49
[58] Field of Search ............ 73/168, 775, 774, 862.38, 73/862.39, 862.49, 862.54, 862.62, 862.64, 862.69, 761

[56] References Cited

U.S. PATENT DOCUMENTS

| | | |
|---|---|---|
| 3,184,962 | 5/1965 | Gay . |
| 3,199,057 | 8/1965 | Gindes et al. . |
| 3,228,240 | 1/1966 | Ormond . |
| 3,535,937 | 10/1970 | Wiggins et al. . |
| 3,603,152 | 9/1971 | Alibert et al. . |
| 3,698,248 | 10/1972 | Vasek . |
| 3,698,249 | 10/1972 | Weaver . |
| 3,742,760 | 7/1973 | Kato . |
| 3,750,475 | 8/1973 | Weaver . |
| 3,866,473 | 2/1975 | Teitelbaum et al. . |
| 3,898,885 | 8/1975 | Russell . |
| 3,965,745 | 6/1976 | Carey . |
| 4,290,311 | 9/1981 | Brewer . |
| 4,412,456 | 11/1983 | Wilhelm et al. . |
| 4,425,800 | 1/1984 | Claassen et al. . |
| 4,566,310 | 1/1986 | Cohen et al. . |
| 4,570,903 | 2/1986 | Crass . |
| 4,646,563 | 3/1987 | Jones . |
| 4,660,416 | 4/1987 | Charbonneau et al. . |
| 4,693,113 | 9/1987 | McNennamy et al. . |
| 4,706,501 | 11/1987 | Atkinson et al. . |
| 4,805,451 | 2/1989 | Leon . |

FOREIGN PATENT DOCUMENTS 1120754 12/1961 Fed. Rep. of Germany ... 73/862.49

Primary Examiner—Robert R. Raevis
Attorney, Agent, or Firm—Panitch Schwarze Jacobs and Nadel

[57] ABSTRACT

Devices and methods for determining axial loads on a generally cylindrical member include a clamp portion removably attached by clamping to a portion of a generally cylindrical load-bearing member. The clamp portion of the device moves in response to diametral deformations in the clamped portion of the cylindrical member. A sensor is provided to sense movement of the clamp portion of the device in response to diametral deformations in the portion of the cylindrical member. The sensor generates signals related to the magnitude of the sensed movement and thus the sensed diametral deformations. The sensed movement may be bending in the clamp portion of the device or distance changes between parts of the clamp portion of the device. A signal storage device, which may also be a computer, stores the signals for real time or delayed determination of axial loading in the member.

16 Claims, 4 Drawing Sheets

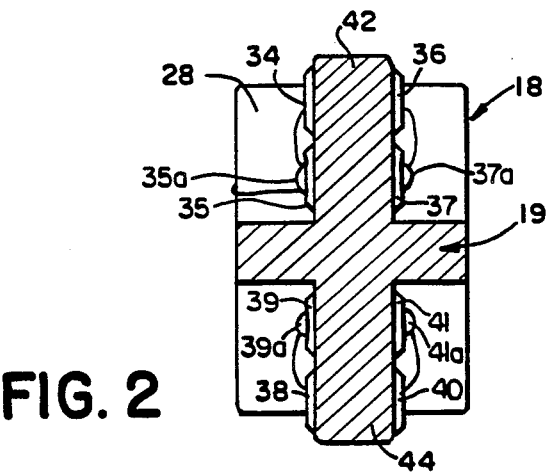
FIG. 2
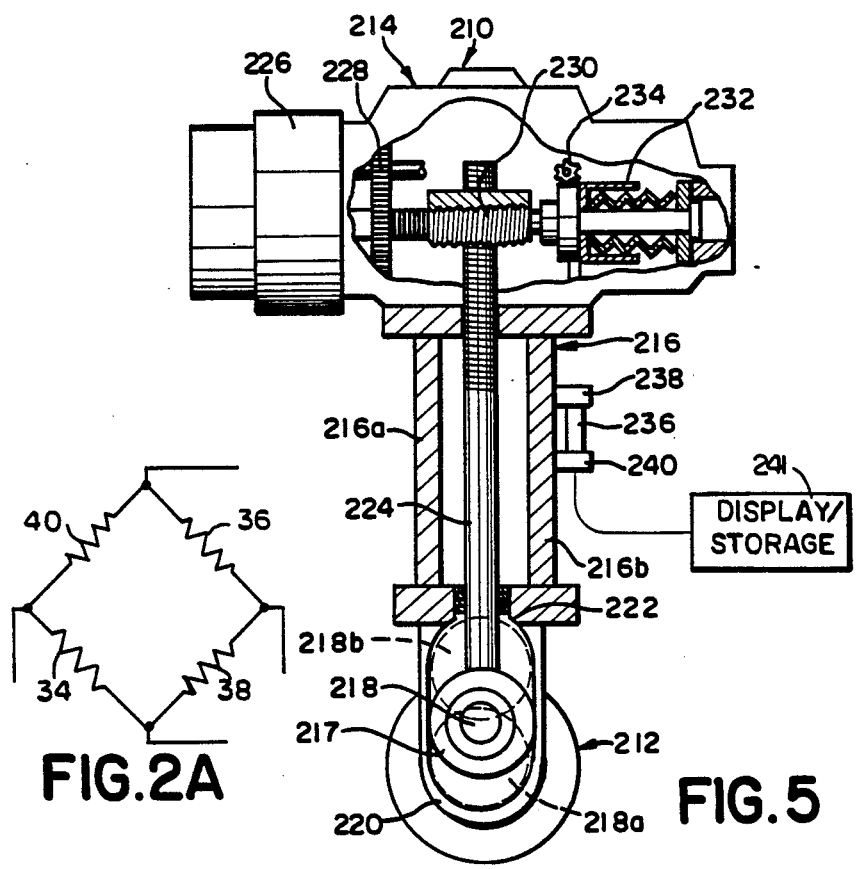
FIG. 2A
FIG. 5

DEVICES AND METHODS FOR DETERMINING AXIAL LOADS

FIELD OF THE INVENTION

The invention relates to load determination and, in particular, to devices and methods that permit easy and rapid determination of axial loads on cylindrical members without modifications to such members by determining diametral deformation of the members.

BACKGROUND OF THE INVENTION

In the nuclear power industry, it is important to ascertain that safety related motor-operated valves ("MOV's"), are set and maintained correctly to operate over the full range of expected normal and abnormal events. MOV's each typically include a valve and a motor operator coupled with the valve through a stem of the valve.

Many plants currently use systems that measure displacement of a spring pack associated with the motor actuator as an indicator of forces in the valve system. The user first calibrates the system by backseating the valve against a calibrated load cell, while recording the outputs from both a spring pack displacement sensor and the load cell. The resulting calibration is thereafter used to infer stem loads during seating, unseating and backseating from traces of spring pack displacement alone.

This apparently straightforward method though is subject to many problems. One is that spring packs typically have substantial initial compression. This means that the valve stem force must build up to a significant level before any further spring pack compression can take place. As a consequence there is a large dead zone within which no forces can be measured. Conversely, there may be clearance between the spring pack and spring pack cavity, allowing the spring pack to displace that amount of clearance in response to virtually no stem force. Even when set with no initial compression and no initial clearance, the compression of the spring pack tends to be on-linear with respect to the force. Furthermore, a condition of grease buildup in the spring pack is not uncommon, and this condition can greatly limit spring pack compression even under the application of very great force. Finally, gear friction forces can also cause the spring pack to compress and this compression can be misread as being due to stem force. In summary, making stem force measurements from spring pack displacement traces is difficult under the best of circumstances, and even then it may require a great deal of art.

Much useful information could be obtained from the motor current trace. This is easier to obtain than spring pack displacement. Motor current, since it responds to all load demands on the motor, can be used to infer stem loads during seating and unseating, packing forces and other system friction forces, and variations in these forces over time. The main difficulty is quantifying these forces, and separating one from another.

The most desirable measurement for accurately monitoring the dynamic events within the MOV would be the direct measure of valve stem load through the use of strain gauges attached to the stem. However, it is impractical to retrofit existing valves in this manner. For most valves, a stem mounted sensor is usable only over a small part of the stem stroke and must be removed to permit full operation of the valve.

Applicant has invented an MOV valve yoke strain measurement system as an acceptable alternative approach to continuous, indirect monitoring of dynamic stem loads. Since valve stem forces cause equal and opposite yoke reaction forces, the resulting yoke strain is an accurate indicator of stem force over the entire valve stroke. The new yoke strain sensor is the subject of related co-pending applications Ser. No. 185,210, filed Apr. 22, 1988 and Ser. No. 87,541, filed Aug. 20, 1987, now U.S. Pat. No. 4,805,451 before both incorporated herein in their entirety, by reference.

The yoke strain sensor is easily applied and calibrated and, since it resists the harsh environments of nuclear power plants, it can be left permanently in place for repeated surveillance tests and for continuous monitoring. The installed yoke strain sensor need be calibrated to the MOV only once. Calibration involves relating yoke strain with valve stem force and is just a function of the particular yoke geometry and the location of the yoke strain sensor on the yoke. After calibration, the yoke strain sensor can be interchanged with any other yoke strain sensor of like strain sensitivity without changing that calibration.

Calibration of the yoke strain sensor to the MOV can be accomplished in different ways. One way is through measurement of the strain that results in the valve stem when the valve is seated (or backseated). The calibration load need not be known. Simple geometrical relationships exist between strain in the valve stem and axial forces or stresses on the valve stem for both unthreaded and threaded circular cylinders (i.e. valve stems). The calibration load may be deduced from measured valve stem strains using these relationships.

One problem in measuring the strain to which the MOV valve stem are subjected is that typically only a portion of the valve stem is exposed and may not be easily accessible through the yoke. Moreover, the attachment of conventional axial (longitudinal) strain gauges directly to valve stems is tedious and time consuming at best, and difficult or virtually impossible for some MOV geometries. In some instances, the length of the valve stem externally accessible may be less than the length needed for installing a conventional axial strain measuring device. Axial strain measuring devices are also subject to error induced by bending or buckling of the valve stem between the axially spaced attachment points of such devices.

It is possible to determine axial strain (and stress) in generally cylindrical members from diametral strain. The ratio of unit diametral contraction to unit axial elongation for a body, referred to as the Poisson's ratio, is known or may otherwise be independently determined for different alloys, dimensions and configurations (hollow/solid, threaded/unthreaded, etc.) typically employed in the MOV valve stems found in nuclear power plants. Typically, the Poisson's ratio for valve stems encountered in power plant MOV's range from about 0.2 to 0.4. Thus, by measuring the diametral deformation on the valve stem, the axial strain and thus the axial force on the valve stem can be determined.

SUMMARY OF THE INVENTION

According to the invention, a device for readily and easily determining axial loads on a generally cylindrical member comprises clamp means adapted for removable attachment to a portion of the cylindrical member for moving in response to diametral deformations in the portion of the cylindrical member; sensor means connected with the clamp means for sensing movement of the clamp means resulting from diametral deformations in the portion of the cylindrical member and for generating electrical signals related to the sensed movement; and computation means connected with the sensor means for determining axial loading of the cylindrical member from the sensor signals.

The invention further includes specific clamping devices themselves useful for diametral strain measurement of a cylindrical member, an methods of determining axial loading for a generally cylindrical member by sensing movement resulting from diametral deformations of the cylindrical member and determining axial loading therefrom.

BRIEF DESCRIPTION OF THE DRAWINGS

The foregoing Summary, as well as the following Detailed Description of the Preferred Embodiments of the Inventions, will be better understood when read in conjunction with the appended drawings. For the purpose of illustrating the invention, there is shown in the drawings, embodiments which are presently preferred. It is understood, however, the invention is not limited to the precise arrangement and instrumentalities shown. In the drawings:

FIG. 2 is a localized, transverse cross-section of the device taken along the lines 2—2 in FIG. 1;

FIG. 2A depicts diagrammatically the balance bridge formed with the strain gauges of the device of FIGS. 1 and 2;

FIG. 5 depicts diagrammatically a conventional motor-operated gate valve assembly with which the devices of the present invention are used.

DETAILED DESCRIPTION OF THE PREFERRED EMBODIMENTS

Like numerals are employed for the indication of like elements throughout the drawings.

Figure 1:
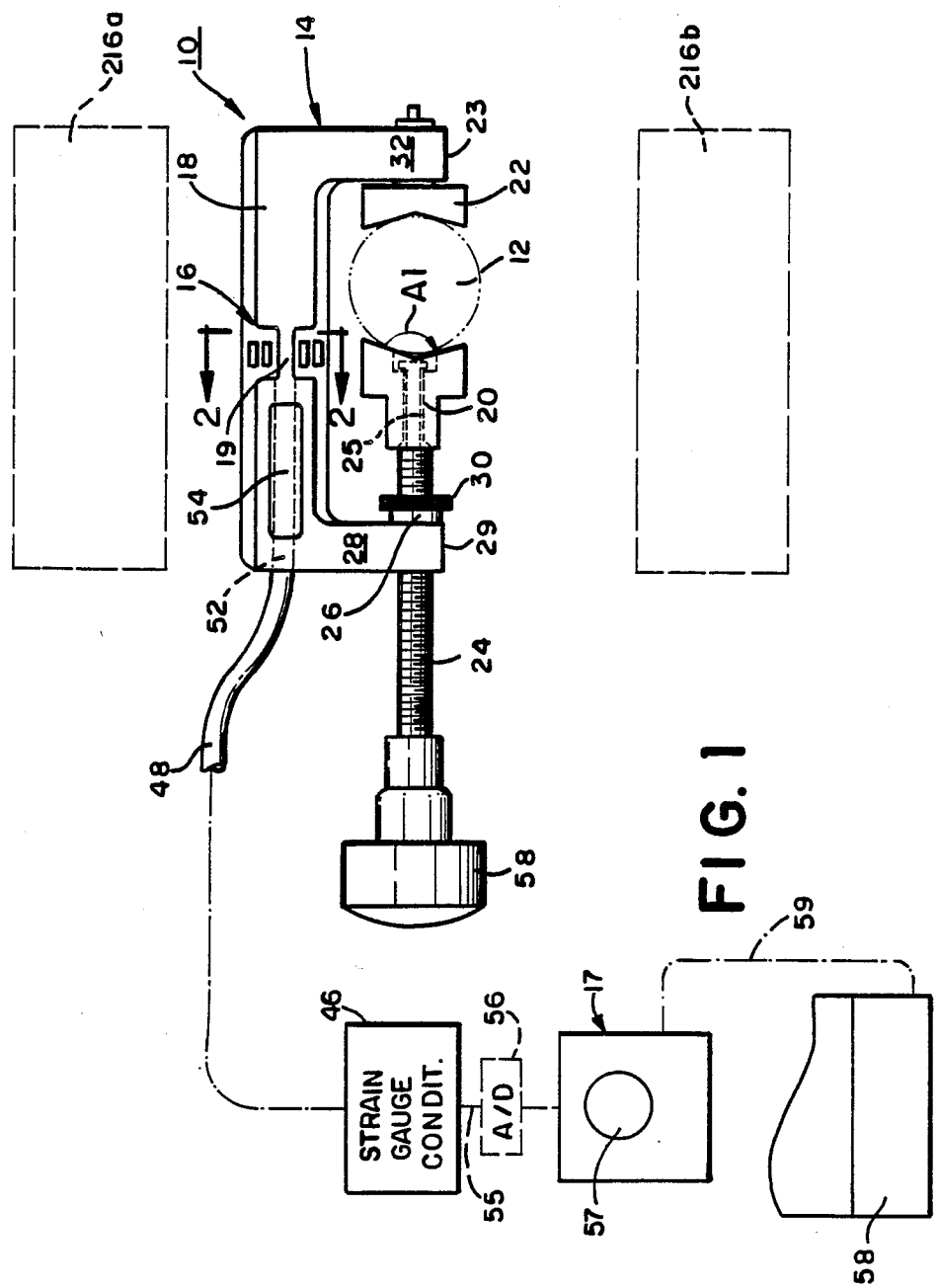
FIG. 1 depicts diagrammatically a C-clamp embodiment of the present invention.

FIG. 1 depicts diagrammatically a first embodiment of the invention, a system for determining axial loading on a load-bearing, generally cylindrical member indicated in phantom at 12. The system includes a C-clamp device indicated generally at 10, used for determining diametral deformations in the cylindrical member which are proportional to its axial loading. The device 10 includes clamp means, identified generally at 14, and sensor means, indicated generally at 16, connected to the clamp means 14. The clamp means 14 and sensor means 16 together constitute a diametral stain measuring device. The system further comprises computation means, indicated generally at 17, connected with the sensor means 16 of the diametral strain measuring device 10 for determining axial loading on the cylindrical member 12 from signals generated by the sensor means 16.

The clamp means 14 is adapted for removable attachment to a portion of the cylindrical member 12 and for moving in response to diametral deformation in the portion of the cylindrical member 12. Specifically, the clamp means 14 includes a generally C-shaped clamp body 18 and first and second clamping members 20 and 22, respectively. The clamping members 20, 22 are supported by the clamp body 18 generally aligned with one another and spaced from one another for receiving a portion of the cylindrical member 12 therebetween. Adjustable mounting means are preferably provided between the clamping member 20 and the body 18 for adjustably positioning the first clamping member 20 with respect to the second 22. Preferably, the adjustable mounting means comprise threaded shaft 24 threadingly received in threaded bushing 26. The first clamping member 20 is preferably rotatably mounted to one end of the threaded shaft 24 by suitable means, such as a screw 25 (in phantom). The threaded bushing 26 is journaled into the clamp body 18. The first clamping member 20 is movable towards and away from the other (second) clamping member 22 for adjustably positioning the first clamping member 20 with respect to the clamp body 18 and the second clamping member 22 and for receiving, engaging and releasing a portion of the cylindrical member 12 with the second clamping member 22. A lock nut 3 permits the shaft 24 and first clamping member 20 to be locked in position once adjusted.

Preferably, each of the clamping members 20 and 22 is a V-block with a constant included V angle A1. Preferably the angle A1 is about 150°. That angle will permit transmission of approximately 0.966 of the diametral deformation of the clamped portion of the cylindrical member 12 engaged between the clamping members 20 and 22 through the clamping members 20 and 22 to the clamp body 18. The second clamping member 22 is preferably rotatably mounted to he clamp body 18, to permit the clamping member 22 to align symmetrically with the clamping member 20 on either side of the cylindrical member 12.

Preferably, a necked region indicated at 19 is provided in an unbroken portion of the clamp body 18 extending continuously between the clamping members 20 and 22. The necked region 19 effectively divides the clamp body 1 into two portions or arms 28 and 32. A first arm 28 extends from one side (the left side in FIG. 1) of one necked region 19 to the remote end 29 of the clamp body 18 and supports the first clamping member 20. A second arm 32 extends from an opposite side (right side in FIG. 1) of the necked region 19 to another remote end 33 of the clamp body 18 and supports the second clamping member 22. Tee necked region 19 of the clamp body 18 has a transverse cross-sectional area, exposed in FIG. 2, which is less than the transverse cross-sectional areas of the clamp body immediately adjoining the necked region on opposing sides of the necked region 19 and less than the cross-sectional areas of the clamp body 18 in the remainder of the portion of the clamp body 18 extending continuously between the clamping members 20 and 22. FIG. 2 illustrates this relation with respect to the transverse cross-section area of arm 28 of the clamp body adjoining the left side (when viewed in FIG. 1) of the necked region 19. The transverse cross-sectional area of the clamp body 18 adjoining the other side of the necked region 19 (right side in FIG. 1) is at least substantially symmetric to that adjoining the left side of the necked region 19. The first and second arms 28 and 32 have greater transverse cross-sectional areas than does the necked region 19 to increase their flexural rigidity relative to that of the necked region 19. The clamp body 18 is continuous and substantially solid and rigid between the clamping members 20 and 22 to support the arms 28 and 32 in a cantilever manner so that the arms 28 and 32 resiliently resist outward bending from diametral expansions of the cylindrical member 12 and resiliently follow diametral contractions of the cylindrical member 12, at least when clamped to the member 12. Consequently, flexing movement or bending of the clamp body 18 resulting from diametral deformations of the clamped portion 12 of the cylindrical member occurs primarily in the necked region 19, making that region a flexural focus point in the clamp body 18.

The sensor means 16 are positioned for sensing movement of the clamp means 14 resulting from diametral deformations in the portion 12 of the cylindrical member which are transmitted through the clamping members 20 and 22 to the clamp body 18 and for generating electrical signals related thereto. Referring now to FIG. 2, the sensor means 16 preferably comprise four individual, axial/longitudinal strain gauges 34, 36, 38 and 40. Strain gauges 34, 36, 38, 40 are mounted in a conventional fashion to opposing sides of webs 42 and 44 of the clamp body at the necked region 19. The strain gauges 34, 36, 38 and 40 are electrically coupled together in a conventional balance bridge circuit indicated diagrammatically in FIG. 2A to sense bending of the clamp body 18 in the necked region 19, through solder joints on terminal strips 35, 37, 39 and 41, also preferably mounted to the clamp body 18 at the necked region 19. The strain gauges 34, 6, 38 and 40 are further coupled with a conventional strain gauge conditioner 46 through a multiwire cable 48. The cable 48 is connected to the strain gauges through insulated lead wires extending from the cable 48 to the solder joints on the terminal strips 35, 37, 39 and 41, as shown in FIG. 1. The strain gauge conditioner 46 applies excitation signals across one pair of opposing junctions of the balance bridge and removes signals from a remaining pair of opposing junctions of the balance bridge. The removed signals are related to bending movement of the clamp body 1B in the necked region 19, induced by diametral deformations in the clamped portion of the cylindrical member 12 which are transmitted to the clamp body 18 through the clamping members 20 and 22. In particular, the conditioner 46 generates sensor signals from the signals removed from the balance bridge circuit which are proportional to bending of the clamp body 18 at the necked region 19 and thus to the diametral deformations in the clamped portion of the cylindrical member 12.

The electrical connections between the lead lines extending from the terminal strips 35, 37, 39 and 41 and the multiwire conductor 48 are preferably made within a bore 52 (indicated in phantom in FIG. 1) extending into one end of the clamp body 18. Access to the bore 52 is provided by a removable cover panel 53. The strain gauges 34, 36, 38 and 40 may be, for example, standard uniaxial 350 ohm foil strain gauges such as Micromeasurements, Inc. Catalog No. EA-06-125BZ-350. The terminals 35, 37, 39 and 41 may be, for example, Micromeasurements, Inc. Catalog No. CTF-25C. The conditioner 46 may be, for example, a Vishay 2100 Series strain gauge conditioner.

To assist in mounting the device 10 for use, an adjustment means in the form of a torque handle 5 is coupled to the first clamping member 20 by mounting to an end of the threaded shaft 24 opposite the first clamping member 20. The torque handle 54 includes an adjustable, internal ratchet mechanism (not depicted) which allows a selected, predetermined torque to be applied and transmitted through the handle 54 to the threaded shaft 24 but which ratchets when the selected torque is exceeded. Generally diametral compressive forces applied to the clamped portion of the generally cylindrical member 12 by clamping members 20 and 22 can be limited to a predetermined value by selection of an appropriate torque setting for the handle 54. The torque handle 54 may be, for example, a Vlier Catalog No. TH-106. Preloading the clamped portion of the generally cylindrical member 12 permits the device 10 to respond to diametral contractions as well as expansions. Although the torque handle 54 is not required, it is valuable in rapidly attaching the device 10 to cylindrical members. It permits the positioning of the clamping member 20 to apply a predetermined compressive force which can be selected to impose a predetermined amount of bending at the necked region 19 of the clamp body 18 to assist in initializing the sensor means 16 for measurement. Also, the provision of torque handle 54 lessens the likelihood of excessive compressive forces inadvertently being applied to a cylindrical member, which may be important in other applications with other types of cylindrical members, such as fragile hollow tubes. Alternatively, though less desirably, the torque handle 54 can be eliminated and the member 24 provided by a suitably modified bolt with a conventional square or hexagonal head (not depicted). A conventional torque wrench can then be used to apply a predetermined torque to the member 24 through its head to accomplish the same predetermined torque loading.

While any of a variety of materials might be employed, a diametral strain measuring device like the device 10 has been successfully constructed with a clamp body 18 formed from 2024 T3 aluminum. In addition to its flexible resiliency and elasticity, this material enables the surfaces of the clamp body 18 to be anodized to a nonconducting state which permits attachment of the strain gauges 34, 36, 38 and 40 and terminals 35, 37, 39 and 41 directly to the surfaces of the webs of 42, 44. The V-block clamping members 20 and 22 are made from a relatively incompressible, nondeformable material such as, for example, a 303 or 410 stainless steel.

It has been found in practice that, given the sensitivity of the identified strain gauges, use of the C-clamp device 10 is practically limited to valve stems and other generally cylindrical load-bearing members having an outer diameter less than about two inches. Cylindrical members o greater diameter require greater spacing of the necked region 19 from the clamping members 20 and 22 and result in a corresponding diminution of the bending of the clamp body 18 at the necked region 19.

The strain gauge conditioner 46 outputs an analog signal varying in value in proportion to bending of the clamp body 18 and thus, to diametral expansions and contractions of the portion of the cylindrical member 12 clamped between the clamping members 20 and 22. This analog signal is carried along line 55 to the computation means 17. The computation means 17 may be a hard wired circuit or, preferably, a computer programmed with the necessary equations for determining axial loading from the diametral strains indicated in the sensor signal from the conditioner 46 for different cylindrical member configurations and constructions. Preferably associated with the computation means 17 is some form of a display, which may be, for example, a CRT 57 indicated diagrammatically. Also preferably associated with the computation means 17 is a data storage device, indicated diagrammatically at 58 coupled to the computation means computer 17 by another line 59. The data storage device may be, for example, a hard copy peripheral such as a printer or chart recorder. A conventional magnetic or optical mass storage device (not depicted) may be used instead or in addition to the hard copy peripheral. Depending upon the implementation of the computation means 17, it may be desirable or even necessary to pass the analog sensor signal from the conditioner 46 through an A to D converter 56 (indicated in phantom) to digitize the signal for subsequent processing. The storage device 58 may be used to store not only the determined axial loading but also the data transmitted by the analog sensor signal outputted from the conditioner 46. The computation means may be, for example, a Compaq 3 minicomputer.

Figure 3:
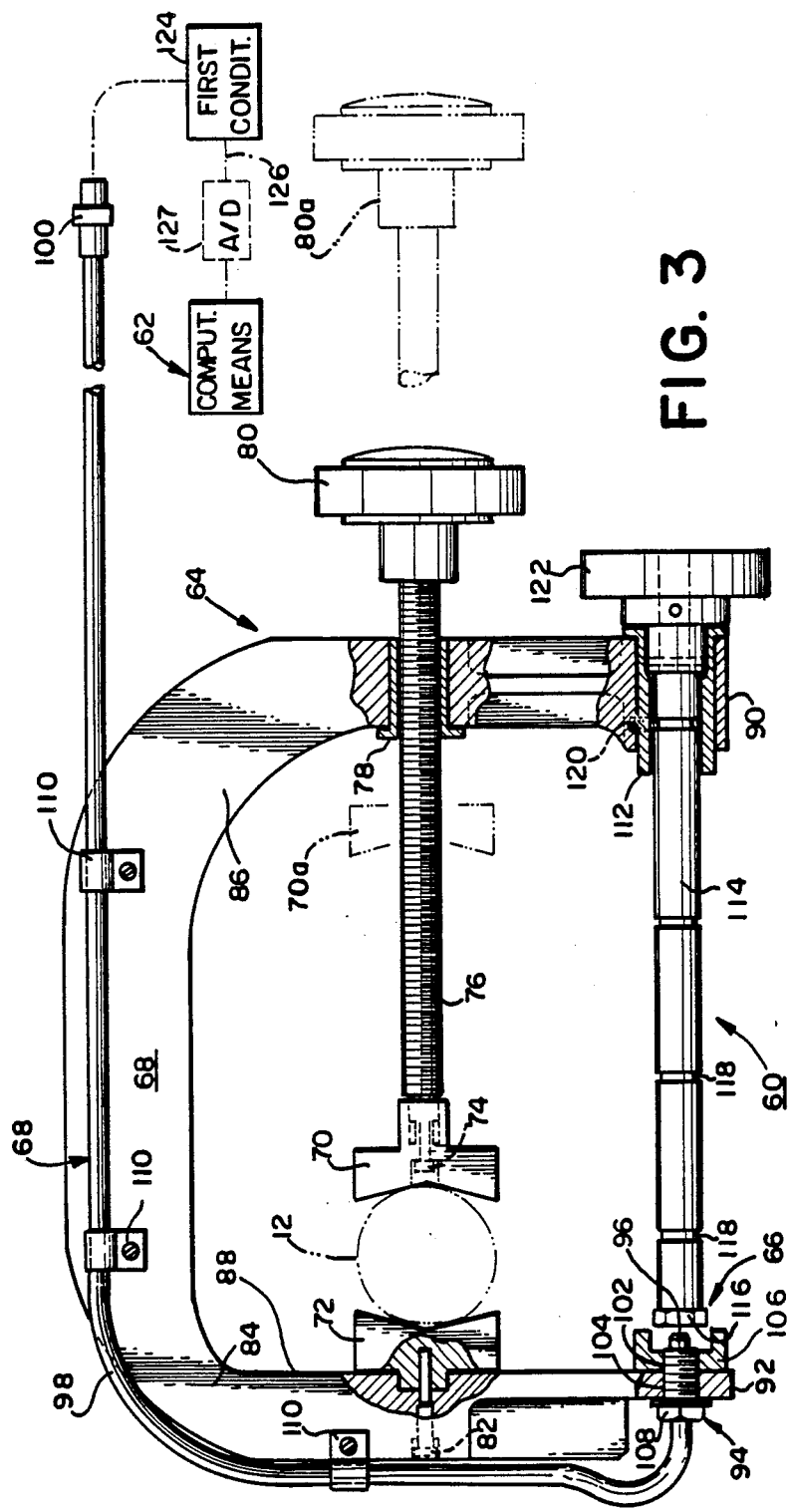
FIG. 3 depicts diagrammatically, in a partially broken-away view, a U-clamp embodiment of the present invention.

FIG. 3 depicts diagrammatically a second embodiment of the invention including a U-clamp device indicated generally at 60, useful for measuring diametral deformations in generally cylindrical members such as valve stems having outer diameters of about two inches or more, and computation means 62 connected with the device 60. The device 60 again includes clamp means, identified generally at 64, adapted for removable attachment of the device 60 to a portion of a generally cylindrical member 12 and for moving in response to diametral deformations in the portion of the cylindrical member 12. The device 60 further includes sensor means, indicated generally at 66, for sensing movement of the clamp means 64 in response to diametral deformations in the portion of the cylindrical member 12 and for generating electrical signals related thereto. The computation means 62 is connected with the sensor means 66 of the device 60 for determining axial loading on the cylindrical member 12 from the sensor means signals.

In particular, the clamp means 64 includes a generally U-shaped clamp body 68 and first and second clamping members 70 and 72, respectively, supported by the clamp body 68 generally axially aligned with one another and spaced from one another for receiving a portion of the cylindrical member 12 (in phantom) therebetween for measurement. The first clamping member 70 preferably is rotatably attached by suitable means such a screw 74 (indicated in phantom) to one end of a threaded shaft 76 passed through a threaded bushing 78 journaled through the clamp body 68. An adjustment means, again preferably comprising a torque handle 80, is coupled with first clamping member 70 by attachment to the remaining axial end of the threaded shaft 76 opposite the first clamping member 70. The handle 80 again permits a selectable, predetermined torque to be applied to the shaft 76 and thus the positioning of clamping member 70 to apply a selectable, predetermined compressive force on the clamped portion of the cylindrical member 12. This permits preloading the device 60 with predetermined forces, to assist in initializing the sensor means 66. The threaded shaft 76 and bushing 78 provide adjustable mounting means which permit the first clamping member 70 to be moved away from the second clamping member 72, for example to a position 70a (indicated in phantom with a corresponding position 80a for the torque knob), for receiving a portion of a generally cylindrical member 12 between the clamping members 70, 72 and to be moved towards the other clamping member 72 for engaging and applying compressive forces on the portion of the cylindrical member 12 captured between the clamping members 70, 72. The second member 72 preferably is rotatably coupled to the clamp body 68 by suitable means such as a screw 82 (partially indicated in phantom), aligned with the first member 70 and central axis of the threaded shaft 76.

Again, preferably each of the first and second clamping members 70, 72 is a V-block having an included V angle of preferably about 150°, and is preferably formed from a relatively incompressible material such as, for example, stainless steel, for transmitting diametral deformations of the portion 12 of the cylindrical member to the clamp body 68.

The clamp body 68 may again be formed by a continuous, unbroken, monolithic member of a resiliently flexible, at least moderately elastically deformable material such as, for example, 2024 T3 aluminum. The clamp body 68 is further adapted to bend in response to diametral deformations of the clamped portion of the cylindrical member 12, primarily in a necked region 84 provided for that purpose in a portion of the clamp body 68 extending continuously between the supported first and second clamping members 70, 72. Again, the necked region 84 is identified by a transverse cross-sectional area less than the transverse cross-sectional areas of the clamp body 68 immediately adjoining the necked region 84 on either side of the necked region 84. The necked region 84 generally divides the clamp body 68 into a first arm 86 supporting the first clamping member 70 through the threaded shaft 76 and bushing 78 and a second arm 88 supporting the second clamping member 72. The first arm 86 extends generally from the necked region 84 to one remote end 90 of the clamp body 68 while the second arm 88 extends generally from the necked region 84 to another remote end 92 of the clamp body 68. At least the portions of the arms 86 and 88 extending between the necked region 84 and the clamping members 70, 72 are provided with transverse cross-sectional areas greater than that of the necked region 84, increasing the rigidity of the clamp body 68 in at least those portions of the arms 86 and 88 as compared to the rigidity in the necked region 84. Accordingly, diametral deformations of the portion of the cylindrical member 12 captured between the first and second clamping members 70 and 72 tend to result in bending of the body 68 primarily in the necked region 84. The necked region 84 therefor constitutes a flexural focus point of the clamp body 68.

The sensor means 66 of the depicted U-clamp embodiment 60 preferably comprises a proximity probe indicated generally at 94 including a proximity detecting means or detector 96 and a multiwire conductor 98 coupled with the detector 96, and a conditioner 124 coupled to the detector 96 through the conductor 98. The detector 96 is supported by the second arm 88 of the clamp body 68 between the second clamping member 72 supported by that arm and the remote end 92 of that arm 88, preferably proximal to the remote end 92. The proximity detector 96 has an exteriorly threaded housing 102 which is passed through a smooth bore 104 extending through the arm 88. First and second threaded locking members 106 and 108 are threaded to the housing 102 on either side of the arm 88, permitting adjustable positioning of the extreme remote end of the detector 96 transversely with respect to the arm 88. The multiwire conductor 98 preferably is attached to the clamp body 68 by means of brackets 110.

Supported proximal the other remote end 90 of the clamp body 68 and the first arm 86, in a bushing 112 journaled through the first arm 86 at the remote end 90, is a shaft 114. The shaft 114 is substantially axially aligned With the proximity detector 96 nd supports target means in the form of a threaded metal stud 116 whose flat head is generally proximal to, spaced from and aligned with the sensing face of the proximity detector 96 for detection by the proximity detector 96. A plurality of circumferential grooves 118 are spaced along the shaft 114 and releasably engage with a spring loaded pin 120 (in phantom) supported by the bushing 11 for radial movement with respect to the shaft 114. A handle 122 is mounted to an axial end of the shaft 114, opposite the target 116, for ease of handling. The grooves 118 and pin 120 enable the shaft 11 to be moved readily between a plurality of detent positions, thereby permitting the shaft 114 to b withdrawn from the vicinity of the proximity detector 90 to permit the device 60 to be mounted to a cylindrical member and for rapidly repositioning the shaft 114 and target 116 at a predetermined support position with respect to the second arm 86 and proximity detector 96. The shaft 114 may be locked in place by means of a short threaded section (not depicted) provided at the distal end of bushing 112, if desired.

When excited by the first conditioner 124, the detector 96 generates signals carried through the multiwire conductor 98 to the first conditioner 124 which are related to the spacing between the sensing face of the detector 96 and the target 116 and thus to changes in the spacing between the remote ends 90 and 92 of the clamp body 68 and to diametral deformations of the cylindrical member 12. The probe 94 may be, for example, a Bentley-Nevada Catalog No. 21504-00-12-10-02 which employs an eddy current type pancake coil detector 96 to generate analog signals having magnitudes proportional to the distance between the sensing end of the detector 96 and the target 116. A suitable conditioner 124 for use with this probe may be, for example, a Bentley-Nevada 7200 Series Proximitor. The identified probe 94 may be used with an electrically conductive though not necessary ferro-magnetic target means such as an aluminum stud 116. The conditioner 124 generates analog sensor signals which are also proportional to spacing between the target 116 and the detector 66. The analog sensor signals are outputted by the conditioner 124 along a line 126 to the computation means 62. Again the sensor signal from the conditioner 124 optionally may be digitized through a conventional analog to digital circuit 127 (in phantom) for use by the computation means 62.

By positioning the proximity detector 96 and target stud 116 on one side of the clamping members 70, 72 and the generally cylindrical member 12 opposite the flexural focus point of the clamp body 68 provided by the necked region 84, diametral deformations in the clamped portion of the cylindrical member 12 are magnified by the arm 86, 88 at the proximity detector 96 and target 116. The magnification is generally equal to the ratio of the distance of the detector 96 and target stud 116 from the necked region 84 to the distance of the clamping member 72 from the necked region 84. Where the proximity detector 96 and target stud 116 are spaced approximately twice the distance from the necked region 84 as is the second clamping member 72, diametral deformations of the portion 12 of the cylindrical member are approximately doubled at the detector 96 and target stud 116. The U-clamp device 60 measures diametral deformations in generally cylindrical members ranging in outer diameters from about 1¾ inches on up. The device 60 can be used on valve stems up to about 5 inches in diameter in the MOV's commonly found installed in nuclear power plants.

The C-clamp device 10 and U-clamp device 60 described thus far are intended for measuring diametral deformation in the valve stems of motor-operated valves typically found in nuclear power plants and to be fitted around such valve stems between the valve stem and yokes coupling the valves with the motor operators. Portions 216a and 216b of an MOV yoke are indicated in phantom in FIG. 1 to illustrate this positioning. The positioning of clamp device 60 in FIG. 3 is generally the same.

Figure 4:
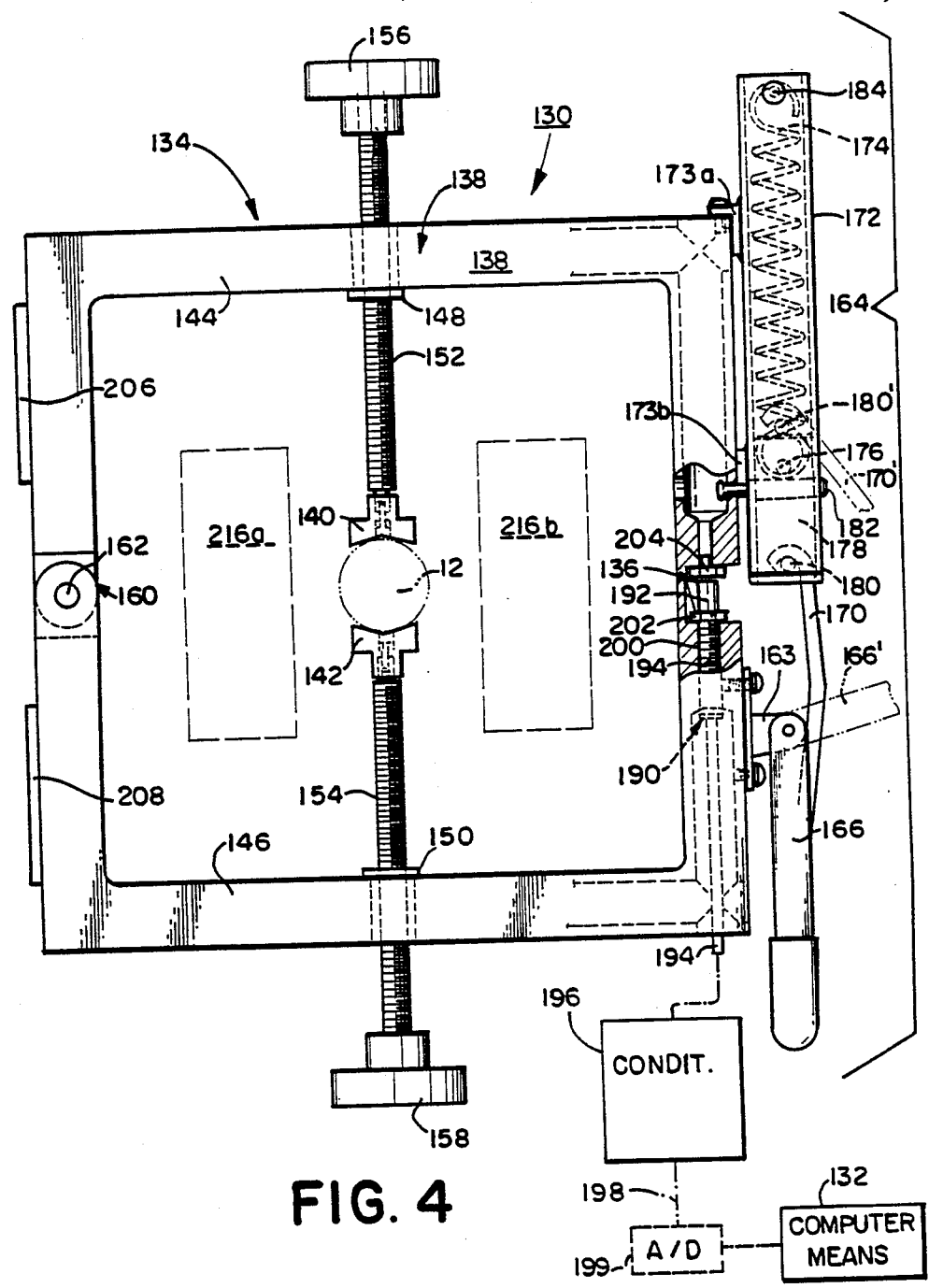
FIG. 4 depicts diagrammatically, in a partially broken-away view, a ring embodiment of the present invention.

FIG. 4 depicts diagrammatically a third embodiment of the invention including a "ring" device indicated generally at 130, for measuring diametral deformations in a cylindrical member 12 (again in phantom) and computation means 132 coupled with the device 130. The device 130 includes a clamp means, indicated generally at 134, which can encircle a yoke or other support structure surrounding a cylindrical member 12 to be measured. Portions 216a and 216b of a yoke encircled by the clamp means 134 are again indicated in phantom. Again, the clamp means 134 is adapted for removable attachment to a portion of a generally cylindrical load-bearing member 12 by clamping and for moving in response to diametral deformations in the portion of the cylindrical member 12. The device 130 also includes sensor means, indicated generally at 136, connected with the clamp means 134 for sensing movement between parts of the clamp means 134 resulting from diametral deformations in the portion of the cylindrical member 12 and for generating electrical signals related thereto.

The clamp means 134 includes a substantially square clamp body 138 and first and second clamping members 140 and 142, respectively, supported by the clamp body 138 generally aligned With and spaced from one another. In particular, the clamp body 138 is preferably formed by two substantially rigid and substantially symmetric U-shaped arms 144 and 146 Each arm 144, 146 preferably has a substantially square outer cross-section. The arms 144 and 146 may be center bored (as is partially indicated in phantom along the right side in FIG. 4) to reduce weight. Similar threaded bushings 148 and 150 are journaled through the center of a base of each of the U-shaped arms 144 and 146, respectively, and each rotatably receives a similar threaded shaft 152 and 154, respectively. Each of the shafts 152 and 154 supports on one end thereof, preferably rotatably, one of first and second clamping members 140 and 142, respectively. The bushings 148 and 150 and threaded shafts 152 and 154 constitute adjustable mounting means between each of the clamping members 140 and 142, respectively, and the clamp body 138 for adjustably positioning those members with respect to one another and the clamp body 138. Again, this permits clamping members 140, 142 to be moved away from one another for receiving a portion of a cylindrical member 12 and moved towards one another for engaging and applying compressive forces on the portion of the cylindrical member 12 therebetween. Knobs 156 and 158 are secured to axial ends of each of the shafts 152 and 154 for ease of use. If desired, one or both of the knobs 156 and 158 can be torque knobs like the torque knobs 54, 80 of the C-clamp and U-clamp devices 10 and 60, respectively. Again, the clamping members 140 and 142 are preferably V-blocks made of a relatively incompressible material such as one of the aforementioned stainless steels and have an included V angle of about 150°.

A flexural focus point is provided in a portion of the clamp body 138 extending continuously between the supported clamping members 140 and 142 by hinge means indicated generally at 160 provided for rotatably coupling together the arms 144 and 146. The hinge means 160 includes a pin 162 transversely passing through bores in overlapping, adjoining ends of the arms 144, 146. The arms 144 and 146 are free to rotate with respect to one another about the pin 162 to open the clamp body 138 to receive a generally cylindrical member 12 therein and to position the clamp body 138 around the cylindrical member 12 add yoke arms 216a and 216b or other structure supporting and/or surrounding the cylindrical member 12. The arms 144 and 146 of the clamp body 138 also rotate at the hinge means 160 in response to diametral deformations of the cylindrical member 12 transmitted to the clamp body 138 through clamping members 140, 142.

To enable the clamping members 140, 142 to be compressively loaded against the cylindrical member 12, the clamp means 134 is further provided with a spring means in the form of a spring loaded toggle assembly, indicated generally at 164, for coupling together and uncoupling the ends of the arms 144, 146 remote from the hinge means 160 and pin 162. The assembly 164 includes a handle 166 rotatably mounted to a bracket 168 attached to arm 146 and rotatably supporting a hook 170. The assembly 164 further includes a cylindrical hollow tube 172 coupled to arm 144 by brackets 173a and 173b. The tube 172 contains a coil spring 174 (in phantom). One end of spring 174 extends around a first pin 176 (in phantom) passed transversely through a cylindrical latch spool member 178 (in phantom), coaxial with and movable through the tube 172. A second pin 180 (in phantom) at another end (lower end in FIG. 4) of the spool member 178 is adapted to receive the end of the hook 170. A third pin 182 extends through a longitudinal hook access slot in a side of the hollow tube 172 (the right side in FIG. 4), to prevent the spool member 178 from twisting in the tube 172. A fourth pin 184 passed diametrally through the tube 172 receives the other (upper) end of spring 174. Assembly 164 is depicted in its entirety in the latched condition with the coil spring 174 under tension, coupling the first and second arms 144, 146 together to apply compressive forces through the clamp body 138 and clamping members 140 and 142 on the portion of the generally cylindrical member 12 captured therebetween. The handle 166 and hook 170 of the assembly 164 are further indicated in phantom together with the second pin 180 at 166', 170' and 180', respectively, illustrating the assembly 164 while being initially engaged or released. Unlatching the hook 170 from the second pin 180 permits the arms 144 and 146 to be rotated about pin 162 to open and close the clamp body 138.

The sensor means 136 are again preferably provided by a proximity probe indicated generally at 190 including a proximity detecting means or detector 192 in an externally threaded housing 193, a multiwire conductor 194 having an end coupled with the detector 192 and another end coupled with a conventional proximity probe signal conditioner 196. The threaded housing 193 is rotatably received in threaded bore 200 proximal one remote end of the clamp body 138, which has been partially broken away in FIG. 4 to reveal the bore 200, for coupling with the clamp body 138 and for sensing distance changes between parts of the clamp means 134, namely between the ends of the arms 144 and 146 which are remote from the flexural focus point provided by a hinge means 160 and which are also the remote ends of the clamp body 138. A lock nut 202 is threadingly received on the housing 193 to lock the detector 192 in a selected position. An electrically conductive though not necessarily ferro-magnetic target means, such as an aluminum stud 204, is received in the arm 144 at the other remote end of the clamp body 138, adjoining and spaced from the proximity detector 192. Again, the conditioner 196 excites the detector 192 by means of a signal passed on conductor 194 and generates an analog sensor means signal from a return also passed through the conductor 194. The analog sensor means signal generated by the conditioner 196 is carried on line 198 from the conditioner 196 to the computation means 132 for determination of the axial loading on the cylindrical member 12. Again, if the computation means 132 requires a digital sensor signal the sensor signal may be digitized through a separate conventional analog to digital converter circuit 199 located between the conditioner 196 and the computation means 132.

In use, the clamping members 140 and 142 are screwed down sufficiently on a portion of the cylindrical member 12 to space the detector 192 and target stud 204 from one another and the adjoining ends of the arms 144 and 146 remote from the pin 162 from one another for possible diametral contractions of the cylindrical member portion 12. In the device 130, the proximity probe may be, for example, a Bentley-Nevada Catalog No. 21505-00-20-30-02 while the conditioner 196 again may be a Bentley-Nevada 7200 Series Proximitor. Again, by positioning the detector 192 and target 204 of the sensor means 136 on a side of the clamping members 140 and 142and the cylindrical member 12 opposite the flexural focus point provided by hinge means 160, diametral expansions and contractions of the clamped portion of the cylindrical member 12 are magnified by the geometry of the arms 144, 146 and the hinge means 160. Lastly, counterweights 206 and 208 may be attached to arms 144 and 146, respectively, on either side of the hinge means 160, to balance the weight of the spring-loaded toggle assembly 164 and prevent the device 130 from sagging on one side (right side in FIG. 4) under the weight of the assembly 64.

The ring device 100 is intended to be used with a full range of cylindrical member diameters including smaller diameter valve stems which may not be sufficiently accessible for use of the C-clamp and U-clamp devices 10 and 60.

Use of the axial load determining systems of the invention using devices 10, 60 and 130 will now be explained with additional reference to FIG. 5 which depicts a conventional motor-operated gate valve assembly indicated generally at 210, with which one or more of the devices 10, 60 and 130 may be used. The motor-operated gate valve assembly indicated generally at 210 is a type of MOV generally well known in the art and commercially available from a variety of sources. The motor-operated gate valve assembly 210 includes a valve indicated generally at 212 and a valve actuator or operator indicated generally at 214 which are connected together by a yoke indicated generally at 216. The valve 212 includes a housing 217 with a fixed valve seat 220 and a fixed valve backseat 222. A valve gate 218 is movable between a "seated" position (indicated in phantom at 218a), in which it engages the valve seat 220, closing the valve, and a "backseated" position (indicated in phantom at 218b) in which it engages the valve backseat 222, fully opening the valve 212. The valve gate 218 is shown in solid in an intermediate position.

The valve gate 218 is moved between the seated and backseated positions by action of the valve stem 224, one end of which is secured to the valve gate 218 and an opposing end of which extends into the valve operator 214.

The valve operator 214 is comprised of a motor 226 having an output shaft (not depicted) connected through suitable reduction gears indicated collectively as 228 to a combination worm and worm gear, indicated collectively as 230. The worm gear includes an internal threaded opening (not show) which serves as a stem nut to engage threading on the upper end of the valve stem 224. Operation of the motor 226 results in rotation of the gears 228 and 230 and corresponding vertical movement of the valve stem 224 and coupled valve gate 218.

The distal (rightmost) end of the worm s connected to a spring pack 232 in a manner well known in the art. A separate small gear 234 is also connected to the worm by way of the spring pack 232. The gear 234, in turn, is connected to a torque switch (not shown) for deactivating the motor 226 when the gear 234 is turned due to a displacement of the spring pack 232 in either direction.

In operation, the valve stem 224 is subjected to varying tensile and compressive loads. To open or close the valve 212, electric power is supplied to the motor 226 which, through the various gears 228, 230, moves the valve stem 224 in the appropriate vertical direction, thereby moving the valve gate 218 towards the valve seat 220 or backseat 222. When the valve gate 218 engages either the seat 220 or backseat 222, vertical motion of the valve stem 224 substantially stops. However, the worm continues to rotate because of the driving force of the motor 226 and is forced to move axially (in FIG. 5, towards the right when closing the valve and towards the left when opening the valve), pushing the spring pack 232 in the same direction, while still compressing the spring pack. Gear 234 is rotated until the torque switch (not shown) cuts off power to the motor 226. It is the continued operation of the motor 226 after the valve gate 218 has engaged the seat 220 or backseat 222 that generates the greatest compressive and tensile axial loads, respectively, in the valve stem 218. The yoke 216 is loaded by the valve stem to an equal and opposite degree. Thus when the valve stem 218 is under a compressive or tensile axial load, the yoke is under a tensile or compressive load, respectively, of generally equal magnitude.

Operation of the devices 10, 60 and 130 are as follows. Initially, the output of each device 10, 60 or 130 preferably is calibrated on a cylindrical member being subjected to a known, calibrated diametral deformation. In this way, the analog signal output of the various sensor means 16, 66 and 136 can be related to specific amounts of diametral deformation (expansion and/or contraction) of the test cylindrical member. The clamp means and sensor means portions of the calibrated devices 10, 60 and 130 may thereafter be used for direct measurement of diametral deformation in and/or for determination of axial loads on a cylindrical member, as follows.

The diametral deformation of a cylindrical member under axial loading is directly related to that loading by known equations. For a solid, smooth walled, circular cylindrical member, axial load, in pounds, on the cylindrical member is related to diametral deformations d in inches by the equation $$P = (\pi/4)(E/\nu)d(\Delta d) \quad (1)$$

where E is the Young's Modulus in psi for the material, $\nu$ is the Possson's ratio (ranging from about 0.2 to 0.4) and d is the outer diameter in inches of the cylindrical member.

For measurement of axial deformation on a threaded portion of a cylindrical shaft, such as a shaft equipped with Acme threads, the d of equation (1) is that diameter midway between the minor diameter and the basic pitch diameter, and is defined as follows:

$$d = d_T - (0.75/TPI) \quad (2)$$

where $d_T$ is the outer diameter of the threads and TPI is the threads per inch.

For measurement of hollow (tubular) circular cylindrical members having outer and inner diameters, $d_o$ and $d_i$, d of equation (1) is defined as:

$$d = (d_o^2 - d_i^2)/d_o \quad (3)$$

and $\Delta d$ is defined as $$\Delta d = \Delta d_o. \quad (4)$$

Use of a computer as the calculation means is preferred because all of the various formulae may be simultaneously stored and selected for use, as needed, on-site.

Any of the various devices 10, 60 and 130 may be used with appropriate computation means to determine axial loads on a yoked valve stem and thus to calibrate a yoke strain sensor of applicant's related invention as follows. The calibrated device 10, 60 or 130 is removably attached by the clamp means portion of the device to a portion of the valve stem 224, exposed between the side members 216a and 216b of the yoke 216 (see FIG. 5) and between the valve 212 and operator 214. The clamp body 18 or 66 of either the C-clamp or U-clamp devices 10 and 60, respectively, typically must be fitted between the valve stem 224 and one of the yoke members 216a or 216b while the clamp body 138 of the ring clamp device 130, if used, typically is placed around the yoke 216, surrounding the side members 216a and 216b of the yoke. This is illustrated diagrammatically in FIG. 1 with respect to the C-clamp device 10 and in FIG. 4 with respect to the ring clamp device 130. Mounting of the U-clamp device 60 would be similar to that of the C-clamp device 10. The device 10, 60 or 130 is engaged with the valve stem 224 by clamping, that is, by moving one (or both) of the clamping members to engage the valve stem 224 diametrally with the other clamping member of the device 10, 60 or 130 and to apply compressive forces against the valve stem 224. Preferably, the compressive forces are predetermined to generate a predetermined degree of bending of the clamp body about its flexure point.

A yoke strain sensor 236 of applicant's related invention is mounted to one member, such as member 216b, of the yoke 216 by bracket members 238 and 240, respectively. Output of the sensor 236 is fed to a device 241 suitable for display and/or storage of the signal, such as an electrical meter or a personal computer. The relationship between axial loading in the valve stem 224 and axial deformation in the yoke member 216b is related to the geometry and materials involved and, once determined, remains the same. The operator 214 is actuated to position the valve gate 218 proximal the seat 220 or backseat 222, so as to expose a portion of the valve stem 224 on which one of the devices 10, 60, 130 may be applied. After applying the clamp portion 14, 64 or 134 of device 10, 60 or 130, respectively, in the manner previously described, the apparatus 210 is actuated to seat or backseat the valve gate. Preferably, the device is operated to seat the valve gate 218 so as to impose compressive loads on the valve stem 224 causing the valve stem 224 to expand, thereby reducing the possibility that the device 10, 60 or 130 will disengage from or slip on the valve stem 224. Expansion of the valve stem 224 is transferred to the clamp body through the clamping members causing the arms of the device to bend outwardly. This bending movement between the arm resulting from the diametral deformations in the clamped portion of the valve stem 224 is sensed by the strain gauges 34, 36, 38 and 0 of the C-clamp device 10 and the proximity detectors 96 or 192 of the U-clamp device 0 and ring device 130, respectively. The electrical signals generated by each of the different sensor means 16, 66 and 136 are related to the sensed movement of the respective clamp body 18, 68 or 138 or parts thereof and, in particular, are proportional to diametral deformations in the valve stem 224 which transmitted to the clamp body. The electrical signals generated by the yoke strain sensor 236 are proportional to axial deformation of the yoke member 216b. Knowing the relationship between diametral deformation and axial loading in the valve stem 224 through the invention, the output signals of the yoke strain sensor 236 are calibrated to that loading. Calibrated in this fashion, the yoke strain sensor 236 can thereafter be used to determine axial loads on the valve stem 224.

While the preferred use of the various embodiments of the present invention is in the measurement of diametral strain in valve stems of motor-operated valves, one of ordinary skill in the art will appreciate that the invention can be used to measure diametral deformations in any generally cylindrical, load-bearing member.

Though not indicated, connectors can be used in the electrical connections between and among the various components, particularly between the clamps and the signal conditioners and between the signal conditioners and computation means, to simplify disassembly for transportation and repair.

From the foregoing description, it can be seen that the present invention provides easily used, readily attachable and detachable diametral deformation measuring devices. It will be recognized by those skilled in the art that changes could be made to the various, above-described embodiments, without departing from the broad inventive concepts thereof. It is understood, therefore, that this invention is not limited to the particular embodiments disclosed, but is intended to cover any modifications which are within the scope and spirit of the invention, as defined by the appended claims.

I claim:

1. A system for determining axial loading on a generally cylindrical member comprising:
    clamp means adapted for removable attachment to a portion of the cylindrical member and for moving in response to diametral deformations in the portion of the cylindrical member;
    sensor means connected with the clamp means for sensing movement of the clamp means resulting from diametral deformations in the portion of the cylindrical member and for generating signals related to the sensed movement; and
    computation means connected with the sensor means for determining axial loading on the cylindrical member from the sensor means signals.

2. The system of claim 1 wherein the clamp means comprises:
    a clamp body;
    first and second clamping members supported by the clamp body spaced from one another for receiving the portion of the cylindrical member therebetween and
    adjustable mounting means between at least one of the clamping members and the clamp body for adjustably positioning the one clamping member with respect to the other clamping member and the clam body.

3. The system of claim 2 further comprising adjustment means coupled with the one clamping member for positioning the one clamping member to apply a predetermined compressive force on the portion of the generally cylindrical member.

4. The system of claim 2 wherein at least one of the clamping members comprises a block having an included V angle of about 150°.

5. The system of claim 2 wherein the clamp body includes a flexural focus point in a portion of the clamp body extending continuously between the clamping members, the continuous portion supporting the clamping members in compression with the cylindrical member therebetween, the continuous portion of the clamp body bending primarily in the flexural focus point in response to diametral deformations transmitted through the clamping members.

6. The system of claim 5 wherein the sensor means comprises proximity detecting means supported from the clamp body on a side of the first and second clamp members opposite the flexural focus point.

7. The system of claim 1 wherein the sensor means comprises strain gauge means mounted to the clamp means for sensing strains in the clamp means.

8. The system of claim 1 wherein the sensor means comprises proximity detecting means coupled with the clamp means for sensing spatial changes within the clamp means.

9. The system of claim 1 wherein the member is a generally cylindrical valve stem and further in combination with a motor-operated valve assembly comprising, in addition to the valve stem, a valve including a valve housing containing a movable valve member coupled with one end of the valve stem, an actuator coupled with another end of the valve stem, and yoke means extending partially around the valve stem for coupling the valve housing and the actuator, the portion of the valve stem receiving the clamping means being exposed through the yoke means.

10. The combination of claim 9 wherein the clamping means comprises a clamp body and first and second clamping members supported spaced apart from one another and against the portion of the stem with the clamp body, and wherein the clamp body extends between a portion of the yoke means and the valve stem.

11. The combination of claim 9 wherein the clamping means comprises a clamp body and first and second clamping members supported spaced apart from one another and against the portion of the stem with the clamp body, and wherein the clamp body surrounds the yoke means and the valve stem.

12. The system of claim 1 wherein the clamp means comprises first and second clamping members and a clamp body for supporting the first and second clamping members spaced apart from one another and against the portion of the cylindrical member, at least one of the first and second clamping members being movable with respect to the clamp body for engaging and applying compressive forces on the portion of the cylindrical member, the first and second clamping members moving in response to diametral deformations in the portion of the cylindrical member, and wherein the sensor means comprises proximity detecting means for sensing spatial changes within the clamp means relating to movement between the first and second clamping members from diametral deformations in the portions of the cylindrical member and for generating electrical signals related thereto.

13. The systems of claim 12 further comprising a flexural focus point in a portion of the clamp body extending continuously between the clamping members, the clamp body bending primarily about the flexural focus point in response to the diametral deformations transmitted through the clamping members, the clamp body including one arm supporting one clamping member, the one arm extending generally from the flexural focus point beyond the one clamping member to one remote end of the clamp body, and wherein the proximity detecting means is supported from the one arm on a side of the first and second clamping members opposite the flexural focus point.

14. The system of claim 13 herein the clamp body further comprises another arm supporting the other clamping member, he other arm extending generally from the flexural focus point beyond the other clamping member to another remote end of the clamp body, and the device further comprising target means supported from the other arm at a position proximal to and spaced from the proximity detecting means for being detected by the proximity detecting means.

15. The system of claim 14 wherein the flexural focus point comprises a necked region in a portion of the clamp body extending continuously between the clamping members, the necked region having a transverse cross-sectional area less than transverse cross-sectional areas of the remainder of the portion of the clamp body extending continuously between the clamping members.

16. The system of claim 14 wherein the flexural focus point comprises hinge means rotatably coupling together adjoining ends of the first and second arms and wherein the clamp means further comprise spring means for coupling together ends of the first and second arms opposite the hinge means to apply compressive forces through the clamp body and the clamping members on the portion of the cylindrical member.

* * * * *